(12) United States Patent
Geiger et al.

(10) Patent No.: US 7,008,152 B2
(45) Date of Patent: *Mar. 7, 2006

(54) MACHINE TOOL FOR PROCESSING WORK PIECES ON AT LEAST THREE AXES

(75) Inventors: Dietrich Geiger, Grossbottwar (DE); Wolfgang Horn, Göppingen (DE); Gerald Stengele, Ludwigsburg (DE)

(73) Assignee: Cross Hüller GmbH, Ludwigsburg (DE)

( * ) Notice: Subject to any disclaimer, the term of this patent is extended or adjusted under 35 U.S.C. 154(b) by 132 days.

This patent is subject to a terminal disclaimer.

(21) Appl. No.: 10/312,823

(22) PCT Filed: Jun. 29, 2001

(86) PCT No.: PCT/EP01/07486

§ 371 (c)(1),
(2), (4) Date: Dec. 26, 2002

(87) PCT Pub. No.: WO02/00387

PCT Pub. Date: Jan. 3, 2002

(65) Prior Publication Data

US 2003/0180112 A1    Sep. 25, 2003

(30) Foreign Application Priority Data

Jun. 29, 2000    (DE) ................. 100 31 730

(51) Int. Cl.
*B23C 1/14*    (2006.01)
*B23C 9/00*    (2006.01)
*B23C 1/27*    (2006.01)

(52) U.S. Cl. .............. 409/167; 29/27 C; 82/122; 409/137

(58) Field of Classification Search .......... 407/137, 407/165, 167, 172; 29/27 C, 27 R; 82/122; 409/137, 165, 167, 172
See application file for complete search history.

(56) References Cited

U.S. PATENT DOCUMENTS

| 4,510,668 A | * | 4/1985 | Ishida et al. .............. 29/561 |
| 4,987,668 A | * | 1/1991 | Roesch .................. 409/165 |
| 5,439,431 A | * | 8/1995 | Hessbruggen et al. ...... 29/27 C |
| 5,538,373 A | * | 7/1996 | Kirkham ................. 409/131 |
| 5,688,084 A | * | 11/1997 | Fritz et al. .............. 409/202 |
| 5,781,983 A | * | 7/1998 | Gruner .................. 409/137 |
| 5,819,395 A | * | 10/1998 | Faitel .................... 29/564 |
| 5,940,948 A | * | 8/1999 | Rehm .................... 409/137 |
| 6,161,457 A | * | 12/2000 | Hammer ................. 82/122 |
| 6,220,799 B1 | * | 4/2001 | Okutani et al. ........... 29/26 A |

(Continued)

FOREIGN PATENT DOCUMENTS

DE        4027895 A1   *   3/1992

(Continued)

OTHER PUBLICATIONS

Gurychev S E et al., Feb. 1, 1983, Metal Cutting Machining Tools Determining the Configuration of a Machining Center, Soviet Engineering Research, vol. 3 No. 2.

*Primary Examiner*—Erica Cadugan
(74) *Attorney, Agent, or Firm*—McGlew and Tuttle, PC

(57) ABSTRACT

A machine tool for at least triaxially machining work pieces (15) comprises a work spindle (10) and a working area (14) before the work spindle (10). A z skid (23), which is displaceable in the direction of the spindle (10), is disposed above the working area (14), with a work holding fixture (29) being joined to, and suspended downwards from, the z skid (23).

9 Claims, 7 Drawing Sheets

U.S. PATENT DOCUMENTS

| | | |
|---|---|---|
| 6,328,510 B1 | 12/2001 | Hanrath et al. |
| 6,652,204 B1 * | 11/2003 | Stengele et al. ............ 409/235 |
| 2003/0145449 A1 * | 8/2003 | Lutz ............................ 29/564 |

FOREIGN PATENT DOCUMENTS

| | | |
|---|---|---|
| DE | 198 03 563 | 4/1999 |
| EP | 0 614 724 | 9/1994 |
| EP | 0 742 072 | 11/1996 |
| EP | 0 785 040 | 7/1997 |
| EP | 0 820 835 | 1/1998 |
| EP | 0 916 446 | 5/1999 |
| EP | 0 928 235 | 7/1999 |
| SU | XP-002185697 | 1/1992 |
| WO | WO 96/00633 | 1/1996 |

* cited by examiner

MACHINE TOOL FOR PROCESSING WORK PIECES ON AT LEAST THREE AXES

The invention relates to a machine tool for at least triaxially machining work pieces.

A machine tool of the generic type is known for example from EP 0 742 072 B1 (corresponding to U.S. Pat. No. 5,662,568) and EP 0 916 446 (corresponding to U.S. Ser. No. 09/161 891, now U.S. Pat. No. 6,328,510). In these machine tools, the work spindle which holds the tool is customarily displaced in the z direction. In particular when long distances are worked in the z direction, for instance in gun drilling, this will result in the work spindle slightly sagging. Negative effects of this sag on machining accuracy can be balanced only by complicated compensation processes. In particular in machine tools for high precision jobs in particular of gun drilling, which require especially accurate motion in the z direction, it has been disclosed to embody the work table that supports the work piece for displaceability in the z direction.

In all the familiar machine tools with a work table displaceable in the z direction, the z guide that is allocated to the work table is positioned underneath the work table. This hampers the discharge of chips, which can cause malfunction in particular during dry machining of work pieces.

EP 0 820 835 B1 (corresponding to U.S. Pat. No. 5,940, 948) teaches a machine tool that is provided with a pallet changing device, wherein the work piece is worked while suspended so that the chips can drop down; however, the working motion in the z direction is made by the work spindle also in this case.

DE 198 03 563 C1 (corresponding to U.S. Pat. No. 6,161,457) describes a machine tool, in particular a lathe, with a suspended compound slide rest, on the bottom side of which is provided a tailstock and a work spindle with a chuck for holding a rotarily drivable work piece. Underneath the compound slide rest, provision is made for a vertically displaceable skid which holds a turret.

A machine tool is known from EP 0 785 040 A1, in which the work pieces are mounted on a vertically pivotable boring and turning mill of the type of a turret. The work holding fixtures, which hold the work pieces in suspension, are again rotarily drivable themselves. Allocated to the individual machining stations are tool turrets which are located on vertical cross tables and can consequently be set and displaced along the axis of rotation of the work piece.

EP 0 928 235 A1 (corresponding to U.S. Ser. No. 09/269 611) teaches to further develop a machine tool with a machine bed and a frame disposed thereon in such a way that a frame-type wok holding fixture is also disposed on the machine bed and is stably united with the frame via a single or several connecting beams.

It is the object of the invention to further develop a machine tool of the generic type such that excellent chip removal is accompanied with high precision work piece machining in particular in the z direction.

According to the invention, this object is attained by a machine tool having a machine bed, a frame joined to the machine bed, a work spindle, which, by means of a work spindle motion unit that is disposed on the frame, is movable on a plane spanned by a horizontal x direction and a vertical y direction, and which is designed for holding a tool, and which extends vertically to the plane in a z direction, a working area disposed on the machine bed before the work spindle in the z direction, and a work holding fixture, which includes holding means for a work piece and which is disposed in the working area, characterized in that a z skid, which is displaceable in the z direction, is disposed above the working area and the work spindle; and in that the work holding fixture is joined to, and suspended downwards from, the z skid. The fact that the work piece is suspended and worked and that the motions of machining in the z direction are performed by the work piece ensures highly accurate work piece machining in particular in the z direction. High precision is promoted in particular by the the machine tool as described previously, characterized in that the z skid is drivable in the z direction by at least one z linear motor. Furthermore, the highly accurate work piece machining in the z direction is also achieved by the z skid of the machine tool being mounted on a frame for displacement on z guides, the frame being disposed above the working area.

Especially precise and thus positionally accurate actuation of the s skid is attained by the machine tool having the frame, and a second frame, the machine bed and props, which connect the frame with the machine bed on a side that faces away from the work spindle, form an inherently rigid machine frame that defines the working area.

The machine tool with the work spindle disposed on a compound slide rest formed by a y skid and an x skid or a machine tool with the work spindle that is non-displaceable in the z direction also promote the precision of machining in the z direction.

A machine tool with a work holding fixture having a recess for a fitting piece that holds a work piece or a machine tool having a holding means that is a chucking device reflect advantageous designs of the work holding fixtures on the z skid.

The machine tool is provided a chip removal arrangement underneath the work holding fixture and the work spindle to serve for chip removal underneath the work piece.

Further features, advantages and details of the invention will become apparent from the ensuing description of an exemplary embodiment, taken in conjunction with the drawing, in which FIG. 1 is a side view of a machine tool with a supply and take-down equipment;

Figure 1:
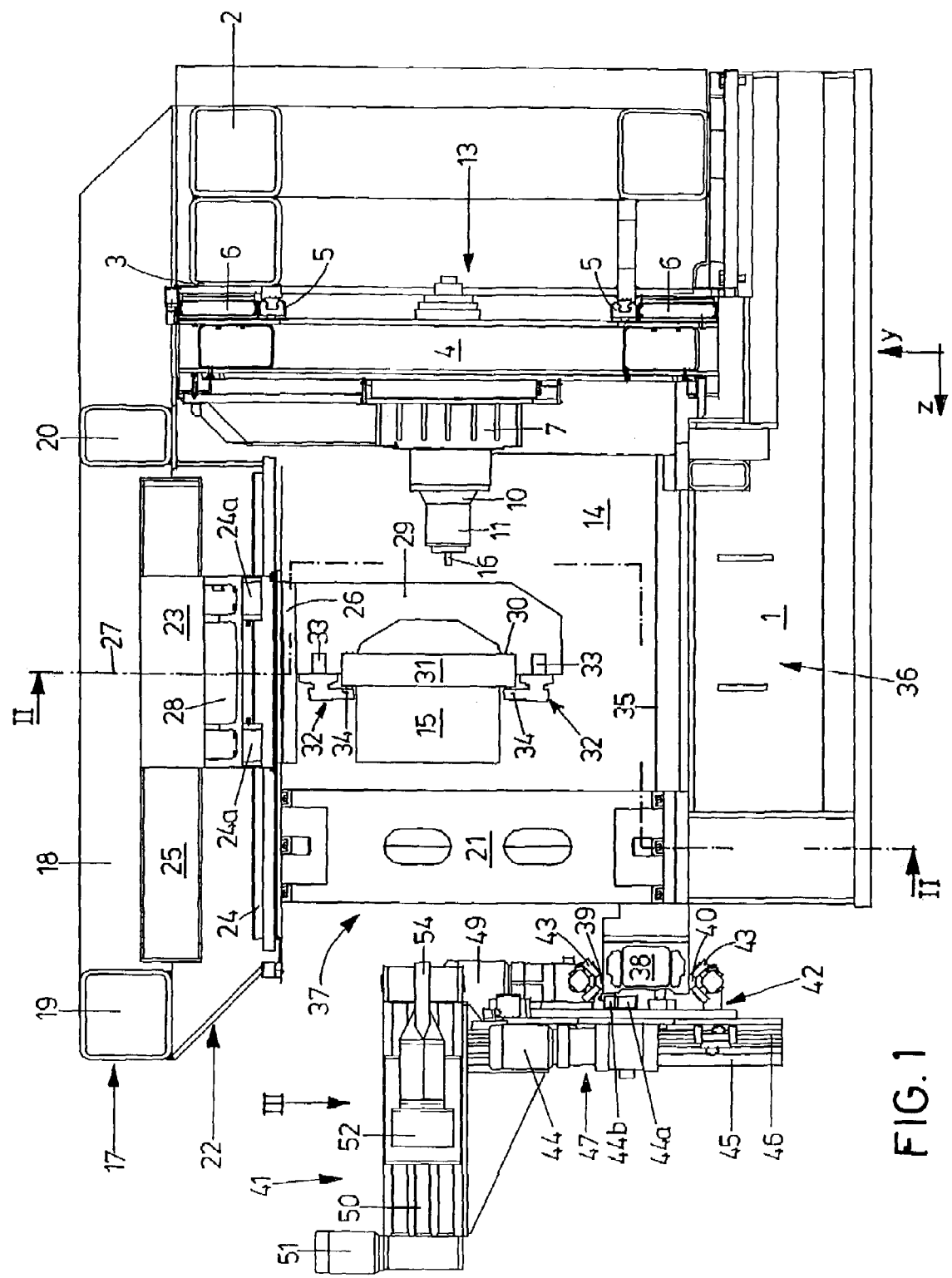
Figure 2:
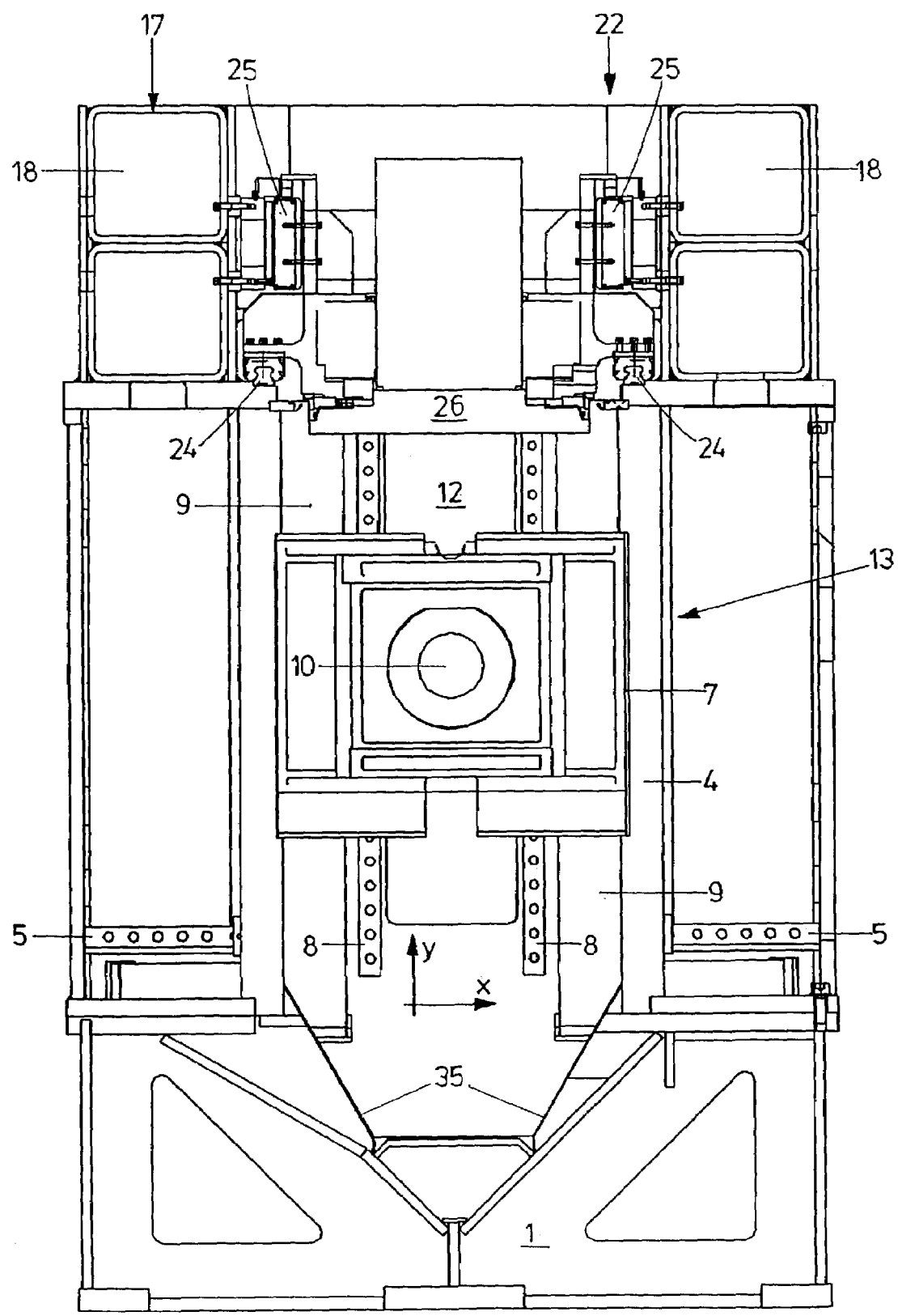
FIG. 2 is an elevation, on the line II—II of FIG. 1, of the machine tool according to FIG. 1.

As seen in particular in FIGS. 1 and 2, a frame 2 is mounted on a machine bed 1. Mounted on a front 3 of the frame 2 is an x skid 4 for horizontal displacement in an x direction on x guides 5. Actuation takes place by means of x linear motors 6. Mounted on the x skid 4 is a y skid 7 for vertical displacement in the y direction on y guides 8. Actuation takes place by means of y linear motors 9. Disposed on the y skid 7 is a work spindle 10, which is rotatably drivable by a motor (not shown) and has a tool holding fixture 11 on its end that faces away from the frame 2. The work spindle 10 extends in the direction towards the frame 2 through an opening 12 in the x skid 4 between the y guides 8 and reaches into the frame 2. The work spindle 10 extends in a z direction perpendicular to a vertical plane spanned by the x direction and the y direction. The work spindle motion unit 13 in the form of a cross-skid, which has been described so far, has a basic structure that is generally known as a box-in-a-box mode of construction and has been illustrated for instance in EP 0 742 072 B1 (corresponding to U.S. Pat. No. 5,662,568 A). By alternative, displaceability of the work spindle on the x-y plane may also be effected by couplers as known from EP 0 916 446 A1 (corresponding to U.S. Ser. No. 09/161 891).

Located in front of the tool holding fixture 11 and the work spindle 10 is a working area 14, where a work piece 15 is machined by a tool 16 that is held in the tool holding fixture 11. Arranged above this working area 14 is a top frame 17, which is composed of longitudinal beams 18 that run in the z direction and crossbeams 19, 20 that run in the x direction, and which, at its end turned away from the frame 2, supports itself via props 21 on the machine bed 1. Big advantages are offered by this rather rigid overall construction of a machine frame 22 which comprises the machine bed 1, the frame 2, the top frame 17 and the props 21. This machine frame 22 defines the working area 14.

A z skid 23, which is movable in the z direction, is led on z guides 24 by means of guide shoes 24a for displacement between the longitudinal beams 18 of the top frame 17. Actuation takes place by z linear motors 25. By alternative, actuation in the x, y and z direction may also be effected by rotary motors, for instance electric motors, via ball bearing spindles.

Attached to the underside of the z skid 23 is a work piece turntable 26 which is mounted for rotary actuation about its vertical, y-directed center line 27 by a turntable drive motor 28. Attached to the underside of the turntable 26 are work piece holding means in the form a work holding fixture 29 with a recess 30 that is suited to a fitting piece 31 substantially in the form of a plate that bears the work piece 15. The holding fixture 29 further comprises holding-fixture chucking devices 32 which are actuated by chucking actuators 33. By means of jaws 34, the chucking devices 32 retain the fitting piece 31 in the recess 30 of the holding fixture 29, whereby the work piece 15, which is mounted in a precisely defined position on the fitting piece 31, obtains a precisely defined position relative to the holding fixture 29 and thus to the turntable 26.

The chucking devices 32 are located above and underneath the recess 30, holding the fitting piece 31 in its top and bottom area. As seen in particular in FIG. 1, the work piece 15, in each position of the z skid 23 and in each position of rotation of the turntable 26, projects over the entire working area 14 into a position free from the work holding fixture 29. Located underneath the work piece 15 is a chip removal arrangement 35 in the form of chip clearances.

Figure 3:
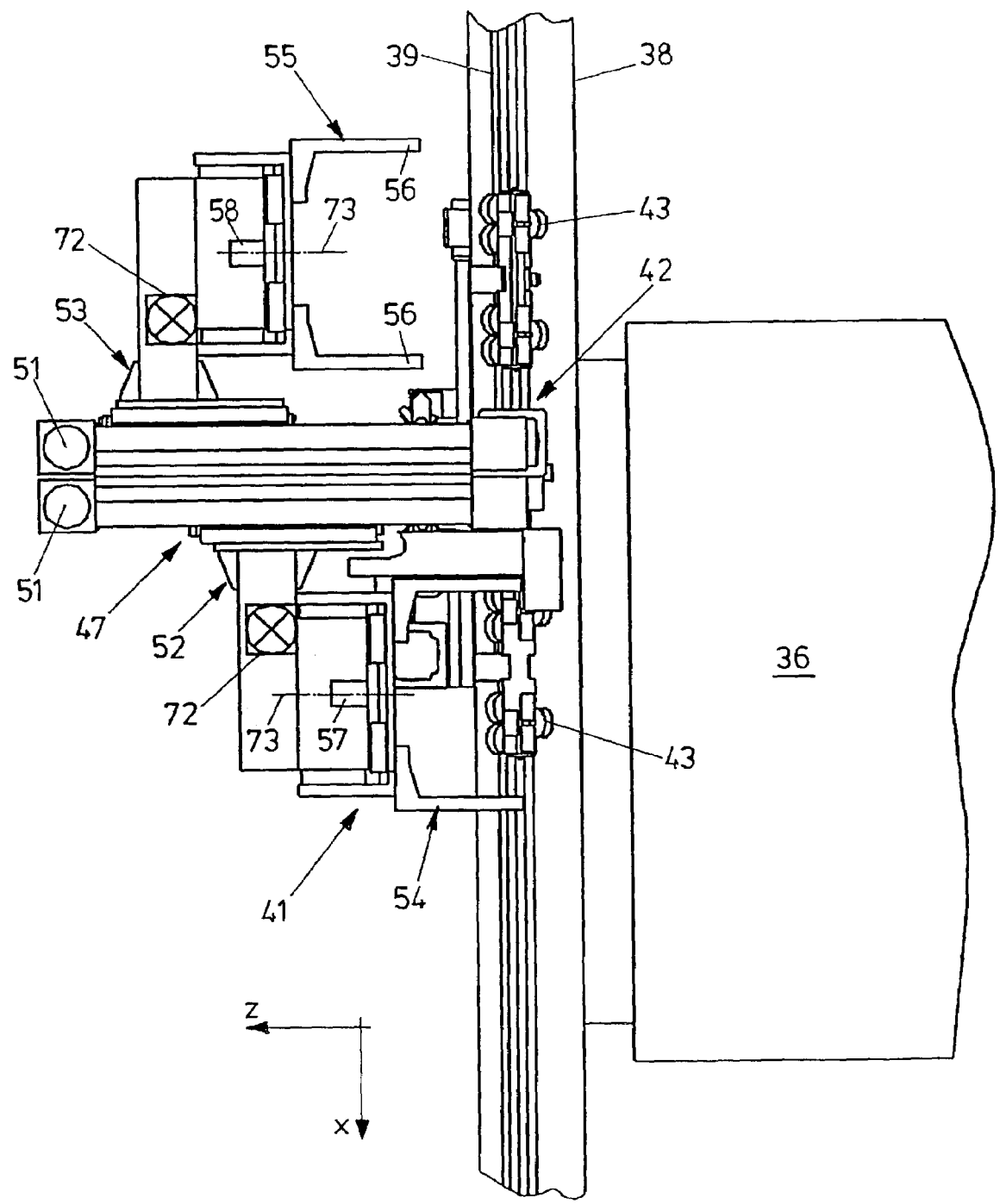
FIG. 3 is a plan view of the supply and take-down equipment in accordance with the arrow III of FIG. 1.

Of the machine tools 36 specified so far, several machine tools 36a to 36f (see FIG. 4) of fundamentally identical design are provided side by side in a row in the x direction, serving for various jobs of machining one and the same work piece 15; they are interlinked, constituting a flexible manufacturing system. FIG. 3 illustrates only two machine tools 36a, 36b of them.

On the supply and take-down side 37, which is allocated to the props 21 and, therefore, located on the side of the machine tools 36a to 36f opposite the work spindle motion unit 13, provision is made for a conveyor path 38 which interconnects the machines 36a to 36f and is fixed to the machine frames 22, in particular to the respective machine bed 1. The conveyor path 38 comprises a top and a bottom Vee guide 39, 40, on which a supply and take-down equipment 41 is guided for displacement in the x direction. It has a horizontal carriage 42 as an x skid which is led on guides 39, 40 for displacement free from floating and tilting by means of rolls 43 that are spaced apart in the x direction. Actuation takes place by an x electric motor 44 in the form of a gear motor by way of a gear 44a and a pinion 44b or, alternatively, by way of a synchronous belt drive. By alternative, actuation may also take place by a linear motor, in particular by a long-stator linear drive.

The carriage 42 has a vertical beam 45, which extends in the y direction and on which a y skid 47 is disposed for vertical displacement in the y direction by means of y guides 46. Actuation takes place by means of a y electric motor 49. The y carriage 47, which extends substantially horizontally in the z direction, has two z rails 50, on each of which is guided a z skid 52 and 53 for displacement in the z direction as z-displacement means; the z skid 52 and 53 is drivable by a z electric motor 51.

The z skids 52, 53, which stand out from the y skid 47 in the x direction, are provided with work piece grippers 54 and 55 as work piece transfer means; the grippers 54 and 55 are oriented in the z direction towards the working area 14 and equipped with gripping jaws 56, each of which being opened and closed by a gripping-jaw drive 57 and 58. The work piece grippers 54, 55 are jointly displaceable in the y direction and independently displaceable in the z direction; they can be opened and closed independently of each other. In the x direction, they take a given fixed position relative to one another on the beam 45 of the carriage 42. Furthermore, a rotary actuator 54a and 55a is provided in each case, by means of which the respective gripper 54 and 55 is pivotable about its center line 54b and 55b which runs in the z direction.

The mode of operation is explained in conjunction with FIGS. 1 to 3 and FIGS. 4 to 7, which are strongly simplified as compared to the design according to FIGS. 1 to 3. This is why structural components which are strongly simplified as compared to FIGS. 1 to 3 have the same reference numerals as in FIGS. 1 to 3, however provided with a prime.

Figure 4:
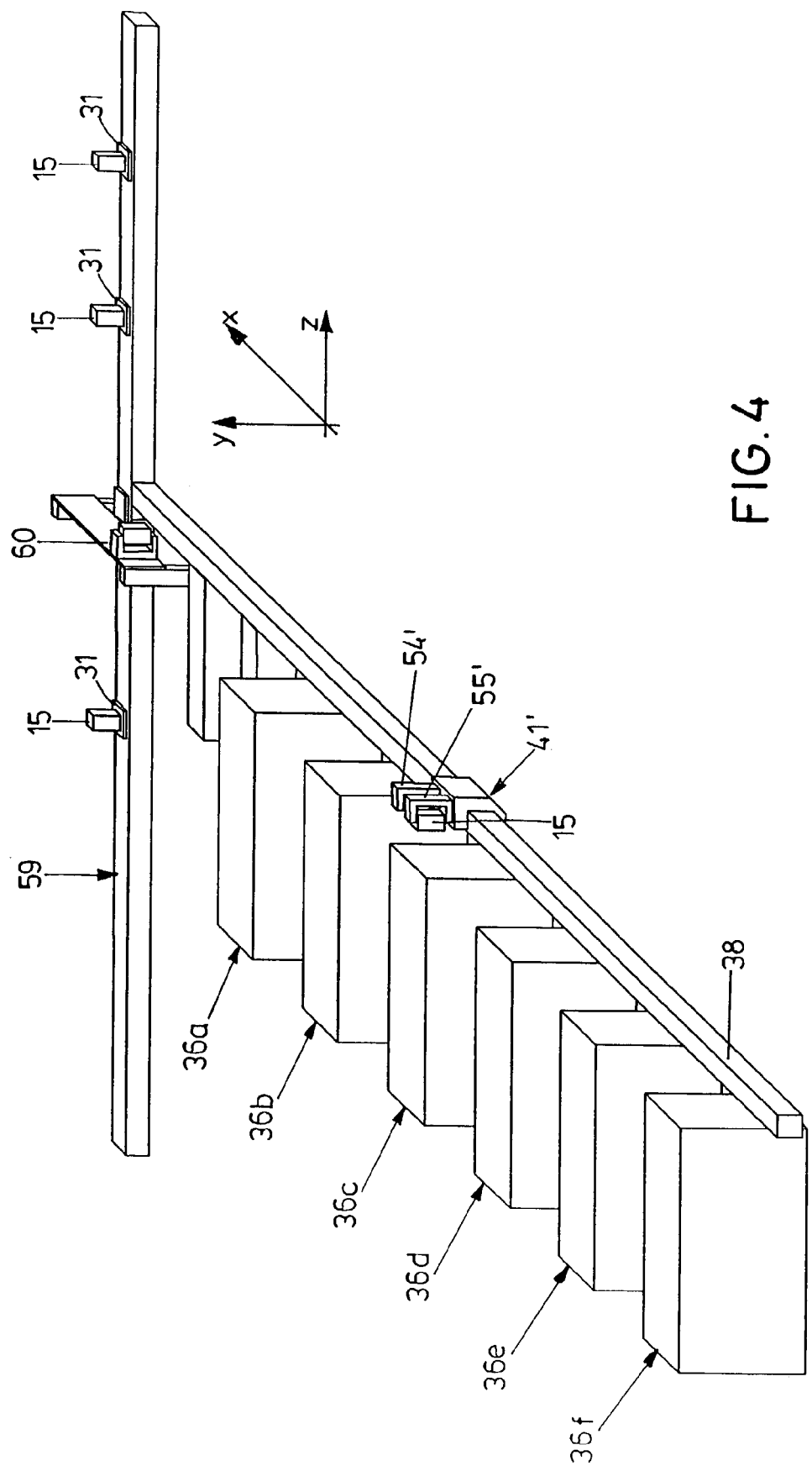
FIG. 4 is a perspective plan view of a diagrammatic illustration of an installation according to the invention.

As seen from the above-mentioned FIG. 4, a greater number of machine tools 36a to 36f are linked together by the conveyor path 38, along which the supply and take-down equipment 41' is movable in the x direction. Upstream of the conveyor path 38 is a feed and discharge equipment 59, for instance in the form of a conveyor belt, on which work pieces 15 that are to be machined are supplied, for example sitting on the fitting pieces 31, and on which finished work pieces 15 are discharged together with their fitting pieces 31. For placement of the work pieces 15 from the feed and discharge equipment 59 on to the supply and take-down equipment 41, and from there again on to the feed and discharge equipment 59, provision is made for a transfer equipment 60 at a place where the conveyor path 38 and the feed and discharge equipment 59 meet.

Figure 5:
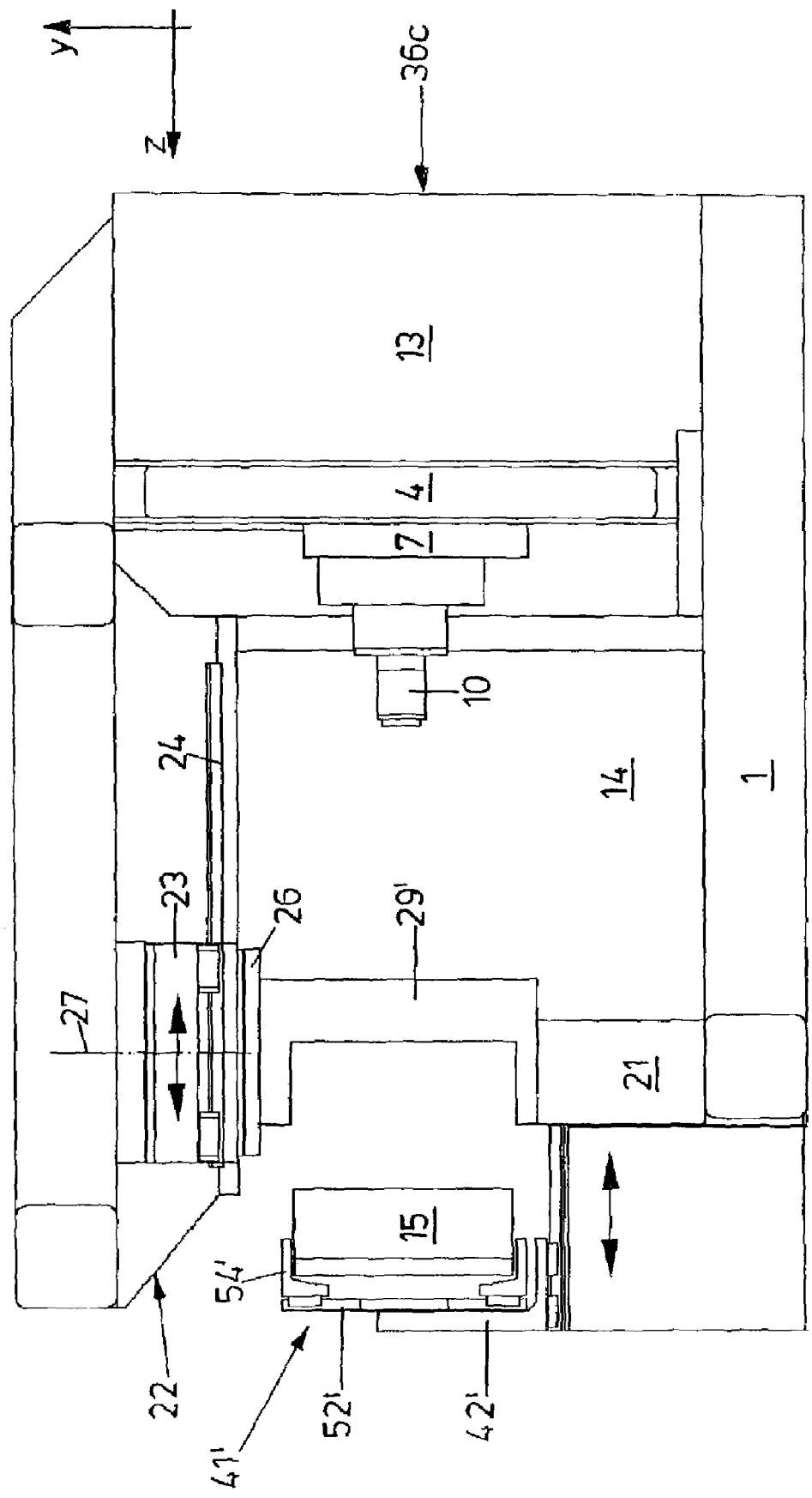
FIGS. 5 to 7 are strongly diagrammatic side views of a machine tool comprising a supply and take-down equipment, with the work piece transfer means and the work piece-holding means in varying positions.
Figure 6:
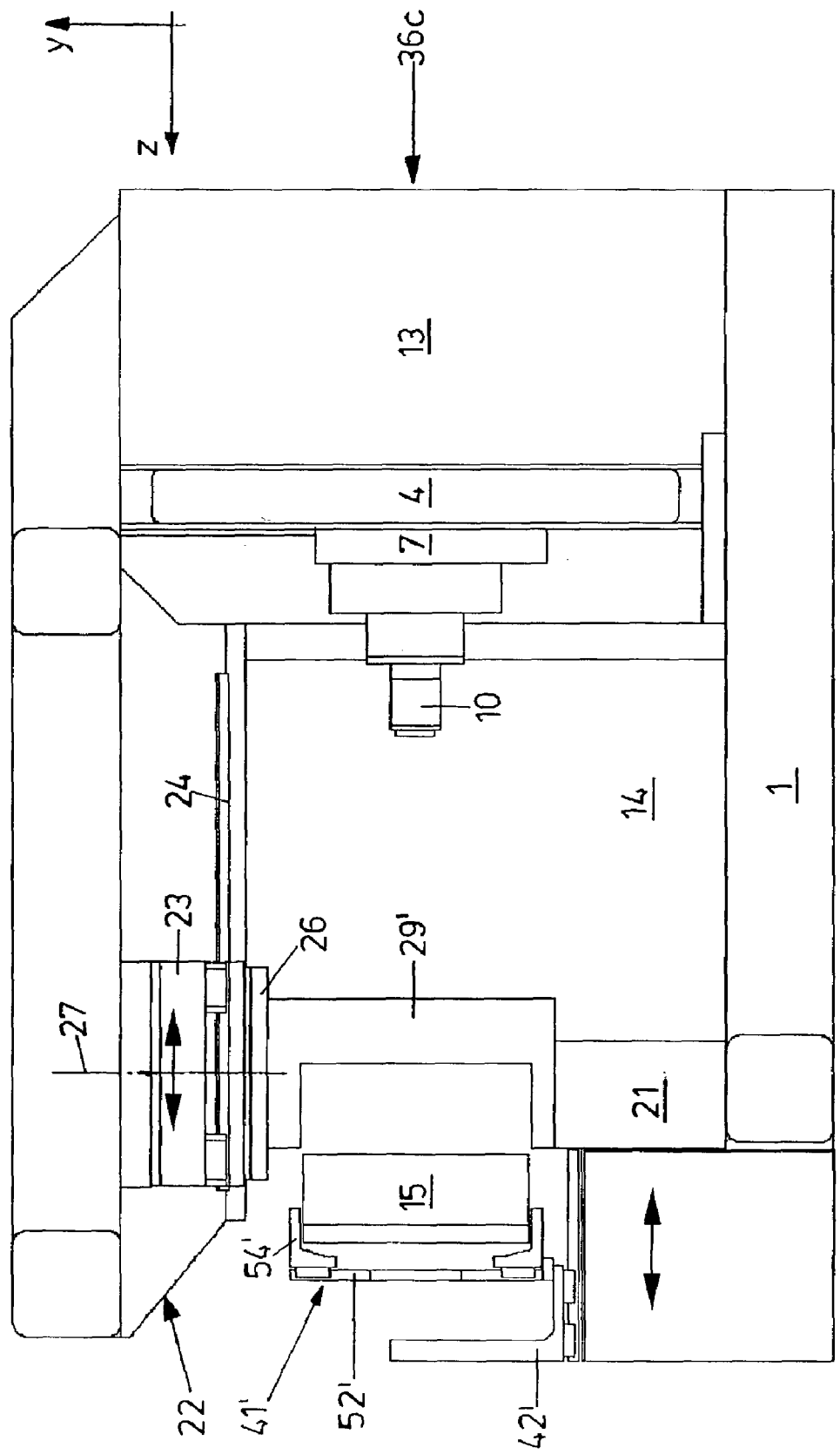
Figure 7:
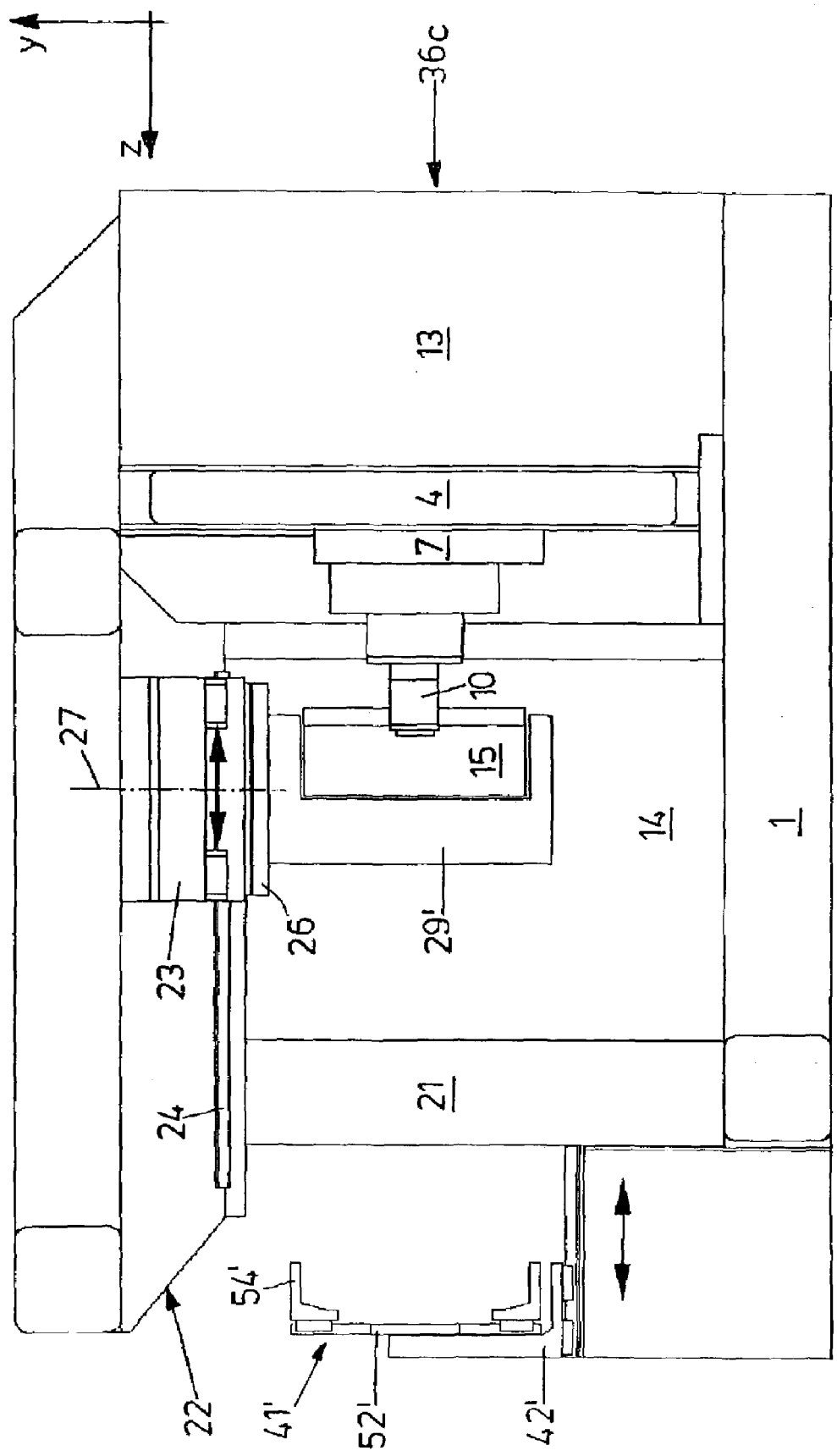

If a machined work piece 15 is in the work holding fixture 29'—which will presumably be so during a conventional manufacturing process—then the work piece turntable 26 and the work holding fixture 29' are in the transfer position seen in FIGS. 1, 5 and 6, which is in vicinity to the supply and take-down equipment 41'. In this position, the turntable 26 is pivoted such that the work piece 15 (not shown in this position in FIGS. 5 and 6) is turned towards the equipment 41'. By corresponding displacement in the y and z direction, the gripper 54', which holds no work piece 15, can seize the work piece 15 by the gripping jaws 56 being closed and remove it from the holding fixture 29' after release of the chucking jaws 34. The gripper 54' is then run in the z direction out of the machine tool 36c. Afterwards the horizontal carriage 42 is moved in the x direction and the work piece gripper 55' in the y direction sufficiently far for the work piece 15, which is seized thereby and still remains to be machined, to move before the work holding fixture 29', which is still in the transfer position, as seen in FIG. 5.

Then the z skid 53', which holds the work piece 15 that is to be machined, and the gripper 55' are moved from the x conveying position seen in FIG. 5 towards the work holding fixture 29', corresponding to FIG. 6, to such an extent that the holding fixture 29' can take up the work piece 15 as illustrated in FIGS. 1 to 3 and as specified above. When the chucking devices 32 have been closed, the gripping jaws 56 open so that the work piece 15 is exclusively held in the work piece holding fixture 29'. The z skid 23 is then moved in the z direction towards the tool 16, the work piece 15 being simultaneously pivoted about the axis 27. In the position seen in FIG. 7, it is machined. The motions of the tool 16 and the work piece 15 relative to one another are performed by the x skid 4, the y skid 7, the z skid 23 and the turntable 26.

Return transfer of the machined work piece 15 then takes place in the way described, by displacement of the z skid 23 and by rotation of the work piece turntable 26 into the position of transfer.

Machining takes place in each machine tool 36a to 36f. For all machines to be able to operate simultaneously, one or several supply and take-down equipments are provided on the conveyor path 38.

What is claimed is:

1. A machine tool for at least triaxially machining work pieces (15), comprising:
    a machine bed (1);
    a first frame (2) joined to the machine bed (1);
    a work spindle (10), which, by means of a work spindle motion unit (13) that is disposed on the first frame (2), is movable on a plane spanned by a vertical y direction and a horizontal x direction, and which is designed for holding a tool (16), and which said work spindle has a rotational axis that extends perpendicularly to said plane in a z direction;
    a working area (14) disposed on the machine bed (1) before the work spindle (10) in the z direction; and
    a work holding fixture (29), which includes holding means (32) for a work piece (15) or a fitting piece (31) that holds a work piece (15) and which is disposed in the working area (14);
    wherein a z skid (23), which is displaceable in the z direction, is disposed above the working area (14) and the work spindle (10); wherein the work holding fixture (29) is joined to, and suspended downwards from, the z skid (23), wherein the z skid (23) is mounted on a second frame (17) for displacement on z guides (24), the second frame (17) being disposed above the working area (14);
    wherein the second frame (17), the first frame (2), the machine bed (1) and props (21), which connect the second frame (17) with the machine bed (1) on a side that faces away from the work spindle (10), form an inherently rigid machine frame (22) that defines the working area (14);
    wherein the work spindle (10) is disposed on a compound slide rest formed by a y skid (7) and an x skid (4) which are part of the work spindle motion unit (13);
    wherein the work spindle (10) is non-displaceable in the z direction;
    wherein a chip removal arrangement (35) is provided underneath the work holding fixture (29) and the work spindle (10); and
    wherein the z skid (23) is drivable in the z direction by at least one z linear motor (25).

2. A machine tool according to claim 1, characterized in that the work holding fixture (29) has a recess (30) for a fitting piece (31) that holds a work piece (15).

3. A machine tool according to claim 1, characterized in that the holding means (32) is a chucking device (32).

4. A machine tool according to claim 1, characterized in that disposed on the z skid is a work piece turntable (26), which is rotatable about an axis (27) that runs in the y direction and from which the work holding fixture (29) is suspended.

5. A triaxial machining tool comprising:
    a working area defined by
        a bottom machine bed;
        a vertical first frame including a vertical compound slide motion unit with a first skid and a second skid attached to said machine bed;
    a work spindle attached to said compound slide motion unit before said working area, said work spindle movable in a plane defined by a vertical and horizontal direction;
    a z tool attached to said work spindle, a rotational axis of the work spindle and said z tool extending in a z direction perpendicular to said plane, before said working area;
    an above second frame attached to said first frame and including a z skid movable in the z direction and disposed above said working area;
    at least one of a workpiece holding unit and a fitting unit, suspended from said z skid;
    a chip removal arrangement underneath said work spindle;
    and wherein the second frame, the first frame, the machine bed, and props, which connect the second frame with the machine bed on a side that faces away from the work spindle, form an inherently rigid machine frame that defines the working area.

6. A triaxial machining tool according to claim 5, wherein said z skid is driven by a linear motor.

7. A triaxial machining tool according to claim 5, wherein said workpiece holding unit includes a recess.

8. A triaxial machining tool according to claim 5, wherein said workpiece holding unit is a chucking device.

9. A triaxial machining tool according to claim 5, wherein said z skid further comprises a work piece turntable rotatable about said vertical direction and holding said workpiece holding unit.

* * * * *